United States Patent
Griesbach

(10) Patent No.: US 11,942,836 B2
(45) Date of Patent: Mar. 26, 2024

(54) SHAFT GROUNDING ARRANGEMENT, TRANSMISSION, AND ELECTRIC AXLE DRIVE

(71) Applicant: ZF Friedrichshafen AG, Friedrichshafen (DE)

(72) Inventor: Michael Griesbach, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 352 days.

(21) Appl. No.: 17/494,311

(22) Filed: Oct. 5, 2021

(65) Prior Publication Data
US 2022/0109353 A1  Apr. 7, 2022

(30) Foreign Application Priority Data

Oct. 6, 2020  (DE) ..................... 10 2020 212 589.9

(51) Int. Cl.
*H02K 11/40*  (2016.01)
*B60K 1/00*  (2006.01)

(52) U.S. Cl.
CPC ............. *H02K 11/40* (2016.01); *B60K 1/00* (2013.01); *B60K 2001/001* (2013.01)

(58) Field of Classification Search
CPC ..... H02K 11/40; B60K 1/00; B60K 2001/001
See application file for complete search history.

(56) References Cited

U.S. PATENT DOCUMENTS

| | | | | |
|---|---|---|---|---|
| 1,896,264 A | * | 2/1933 | Weichsel | H02K 27/10 310/90 |
| 1,896,265 A | * | 2/1933 | Weichsel | H02K 27/10 310/90 |
| 4,515,417 A | * | 5/1985 | Shiraishi | H02K 5/1732 384/537 |

(Continued)

FOREIGN PATENT DOCUMENTS

| | | |
|---|---|---|
| DE | 1091605 | 10/1960 |
| DE | 1970569 U | 10/1967 |

(Continued)

OTHER PUBLICATIONS

German Search Report DE 10 2020 212 589.9, dated May 31, 2021. (12 pages).

*Primary Examiner* — Jacob B Meyer
(74) *Attorney, Agent, or Firm* — Dority & Manning, P.A

(57) ABSTRACT

A shaft grounding arrangement (X) includes a housing (GG), a shaft (W, GW2, DS1, DS2) supported in the housing (GG), a shaft grounding device (E) for establishing an electrically conductive contact (SK) between the shaft (W, GW2, DS1, DS2) and the housing (GG), and a covering element (C) fixedly connected to the shaft (W, GW2, DS1, DS2) for protecting the shaft grounding device (E) against environmental influences. The covering element (C) at least partially surrounds the shaft grounding device (E). The shaft grounding device (E) is fixedly connected to the housing (GG). The electrically conductive contact (SK) is formed by a sliding contact between contact elements (EK) of the shaft (Continued)

grounding device (E) and a surface of the covering element (C). A transmission (G) may include the shaft grounding arrangement (X) of this type, and an electric axle drive (EA) may include the transmission (G).

11 Claims, 3 Drawing Sheets

(56) References Cited

U.S. PATENT DOCUMENTS

| | | | | |
|---|---|---|---|---|
| 4,566,744 | A * | 1/1986 | v Engelenburg | H01R 39/646 439/178 |
| 4,707,157 | A * | 11/1987 | Hauslaib | B41J 11/30 400/616 |
| 5,010,441 | A * | 4/1991 | Fox | H05F 3/02 361/220 |
| 5,454,724 | A * | 10/1995 | Kloeppel | H02K 11/40 310/90 |
| 5,758,404 | A * | 6/1998 | Baumann | H02K 15/16 310/90 |
| 5,804,903 | A * | 9/1998 | Fisher | H02K 11/40 310/221 |
| 5,914,547 | A * | 6/1999 | Barahia | H02K 11/40 310/90 |
| 6,396,179 | B2 | 5/2002 | Sorenson | H02K 11/33 439/20 |
| 7,317,270 | B2 * | 1/2008 | Knauff | H02K 11/20 310/68 B |
| 7,339,777 | B2 * | 3/2008 | Barnard | H01R 39/64 361/212 |
| 7,436,091 | B2 * | 10/2008 | Thomas | H01R 39/46 310/90 |
| 8,189,317 | B2 * | 5/2012 | Oh | H02K 11/40 310/309 |
| 8,488,293 | B2 * | 7/2013 | Baumann | F16C 19/06 361/220 |
| 9,859,672 | B2 * | 1/2018 | Fukumoto | H02K 13/00 |
| 10,253,815 | B2 * | 4/2019 | Hart | F16C 33/7856 |
| 10,305,347 | B2 * | 5/2019 | Herrmann | C10M 147/02 |
| 10,840,779 | B2 * | 11/2020 | Reuter | H02K 7/003 |
| 11,070,114 | B2 | 7/2021 | Lenz et al. | |
| 11,545,877 | B2 * | 1/2023 | Weber | H02K 1/22 |
| 2002/0190588 | A1 * | 12/2002 | Koenigs | H02K 11/40 310/71 |
| 2004/0184215 | A1 * | 9/2004 | Oh | H05F 3/04 361/220 |
| 2005/0285464 | A1 * | 12/2005 | Orders | H02K 5/136 310/239 |
| 2007/0013247 | A1 * | 1/2007 | Tung | F04D 25/062 310/90 |
| 2007/0035194 | A1 * | 2/2007 | Briesewitz | H01R 39/06 310/239 |
| 2008/0042503 | A1 * | 2/2008 | Hartkorn | H02K 1/28 310/90 |
| 2008/0238229 | A1 * | 10/2008 | Iwashima | H02K 5/1732 310/90 |
| 2010/0001602 | A1 * | 1/2010 | Bossaller | H02K 11/40 29/596 |
| 2011/0149459 | A1 * | 6/2011 | Baumann | H02K 11/40 361/212 |
| 2017/0126105 | A1 * | 5/2017 | Okada | B60L 15/2054 |
| 2017/0369012 | A1 * | 12/2017 | Tenckhoff | F16H 57/00 |
| 2018/0274626 | A1 * | 9/2018 | Komyo | F16C 33/72 |
| 2019/0081538 | A1 | 3/2019 | Nye et al. | |
| 2019/0113080 | A1 * | 4/2019 | Kamiya | F16J 15/447 |
| 2022/0107016 | A1 * | 4/2022 | Griesbach | F16H 57/029 |
| 2022/0109353 | A1 * | 4/2022 | Griesbach | H02K 11/40 |

FOREIGN PATENT DOCUMENTS

| | | |
|---|---|---|
| DE | 10249770 A1 | 5/2004 |
| DE | 102016010926 A1 | 9/2017 |
| JP | 2000244180 A | 9/2000 |
| WO | WO 2019/051482 A1 | 3/2019 |
| WO | WO-2021148579 A1 * | 7/2021 |
| WO | WO-2022184333 A1 * | 9/2022 |
| WO | WO-2022234057 A1 * | 11/2022 |
| WO | WO-2022234079 A1 * | 11/2022 |
| WO | WO-2022258309 A1 * | 12/2022 |

* cited by examiner

SHAFT GROUNDING ARRANGEMENT, TRANSMISSION, AND ELECTRIC AXLE DRIVE

CROSS-REFERENCE TO RELATED APPLICATION

The present application is related and has right of priority to German Patent Application No. 102020212589.9 filed in the German Patent Office on Oct. 6, 2020, which is incorporated by reference in its entirety for all purposes.

FIELD OF THE INVENTION

The invention relates generally to a shaft grounding arrangement, a transmission for a motor vehicle having a shaft grounding arrangement of this type, and to an electric axle drive for a motor vehicle having a transmission of this type.

BACKGROUND

From the prior art, it is known to electrically ground a shaft with respect to a housing by a shaft grounding. As a result, for example, damage to the shaft bearings can be avoided, which is caused by a current passage across the shaft bearings. In addition, by grounding the shaft with respect to the housing, an electromagnetic emission of interference signals starting from the shaft can be avoided or at least reduced.

In this regard, for example, patent application JP 2000-244180A teaches a device for reducing electromagnetic interference signals for an electric vehicle. A rotating shaft of the electric drive is electrically coupled to a housing of the electric drive by a sliding contact. The sliding contact is protected against contaminants by a cover connected to the housing. A fixedly covered approach of this type is possible only in the area of the shaft end, however.

An approach for a shaft grounding of a transmission that is remote from the shaft end is described in patent application DE 102 49 770 A1. According thereto, a protective cap, together with a bypass ring, is fixedly connected to the shaft. The bypass ring is pressed, at a largest diameter, against a housing and slides along there, and so an electrically conductive contact is formed between the shaft and the housing. However, there is a risk that liquid and dirt particles will enter the area of the sliding contact, and so the electrical conductivity of the sliding contact deteriorates as the period of operation increases. In addition, there is a high circumferential speed of the sliding contact due to the large diameter of the sliding contact, as the result of which wear and friction work of the sliding contact increase.

SUMMARY OF THE INVENTION

Example aspects of the invention therefore provide an arrangement for the shaft grounding, which is suitable for an application remote from the shaft end, is distinguished by a high durability with respect to environmental influences, and ensures a reliable electrical contact between the shaft and the housing.

As an example solution to the problem, a shaft grounding arrangement is provided, which includes a housing, a shaft, a shaft grounding device, and a covering element. The shaft is supported in the housing, wherein one axial end of the shaft protrudes from the housing. The shaft grounding device is utilized for establishing an electrically conductive contact between the shaft and the housing. The covering element is fixedly connected to the shaft, and so the covering element and the shaft have the same rotational speed. The covering element at least partially surrounds the shaft grounding device, and so the covering element protects the shaft grounding device against environmental influences such as dust and spray water.

According to example aspects of the invention, the shaft grounding device is fixedly connected to the housing, and so the electrically conductive contact takes place by a shaft-side sliding contact. The shaft-side running surface of the sliding contact is not formed by the shaft itself, however, but rather by a surface of the covering element. As a result, the function "providing a running surface that is suitable for the electrical sliding contact" can be detached from the configuration of the shaft and, instead, transferred to the covering element. Therefore, it is no longer necessary to consider the sliding contact when configuring the shaft. The shaft could be made, for example, of steel and the covering element could be made of another material. The covering element could be furnished with a coating for improving the sliding contact, the application of which could be harmful to the heat treatment of the shaft.

Preferably, the covering element is pressed onto a circumferential surface of the shaft. The circumferential surface of the shaft is preferably furnished with a coating in order to improve the electrical conductivity between the circumferential surface and the covering element pressed onto the circumferential surface.

Preferably, the covering element is made of stainless steel. Stainless steel offers a good electrical conductivity and is particularly durable against corrosion, and so this material is particularly well suited for forming the covering element.

Preferably, the covering element has a C-shaped cross-section. As a result, the covering element can surround the shaft grounding device, at least partially or in sections. The radially inner C-leg can be pressed onto the circumferential surface of the shaft, and the radially outer C-leg can surround a section of the shaft grounding device and, thereby, protect the shaft grounding device against environmental influences.

The contact elements of the shaft grounding device can be designed, for example, as a brush. The brush ends establish the electrically conductive sliding contact with the covering element. The brushes are attached at an electrically conductive holder, wherein the holder is electrically conductively connected to the housing. Alternatively to the design as brushes, the contact elements can be formed by electrically conductive PTFE elements. The conductivity of the PTFE can be achieved by appropriately conductive fillers.

The shaft grounding device can be an integral part of a transmission for a motor vehicle, for example, a planetary gear set-based automatic transmission, a dual-clutch transmission, an automated transmission, or a CVT transmission. All these transmissions can be exposed to environmental influences in the motor vehicle, such as spray water, salt, and dust, and so the approach of the shaft grounding device provided here is particularly advantageous.

Preferably, the shaft of the transmission, at which the shaft grounding arrangement is provided, is formed by the output shaft of the transmission. A further, transmission-external shaft is usually connected at the output shaft of the transmission in order to transmit the torque converted by the transmission to other components, for example, to a differential gear or a drive axle of the motor vehicle. Therefore, a simple covering of the shaft end of the output shaft is not possible, and so the approach provided here is particularly advantageous.

Preferably, the transmission includes an electric machine and a power converter associated with the electric machine. Due to the pulse-like current supply of the electric machine by the power converter, electromagnetic interference signals can arise, which are coupled into one or several of the transmission shafts. Due to the shaft grounding device, these interference signals can be coupled in an easy way to the housing of the transmission, which is usually connected to an electrical ground of the motor vehicle. As a result, a simple return path of the interference signals is made possible, and so the electromagnetic compatibility of the transmission is improved.

The transmission can be an integral part of an electric axle drive. These types of axle drives are also exposed to spray water, salt, and dust, and so the approach provided here is particularly advantageous for this application.

BRIEF DESCRIPTION OF THE DRAWINGS

Exemplary embodiments of the invention are described in detail with reference to the following figures, in which FIG. 1 and FIG. 2 each show a drive train of a motor vehicle having a transmission.

DETAILED DESCRIPTION

Figure 1:
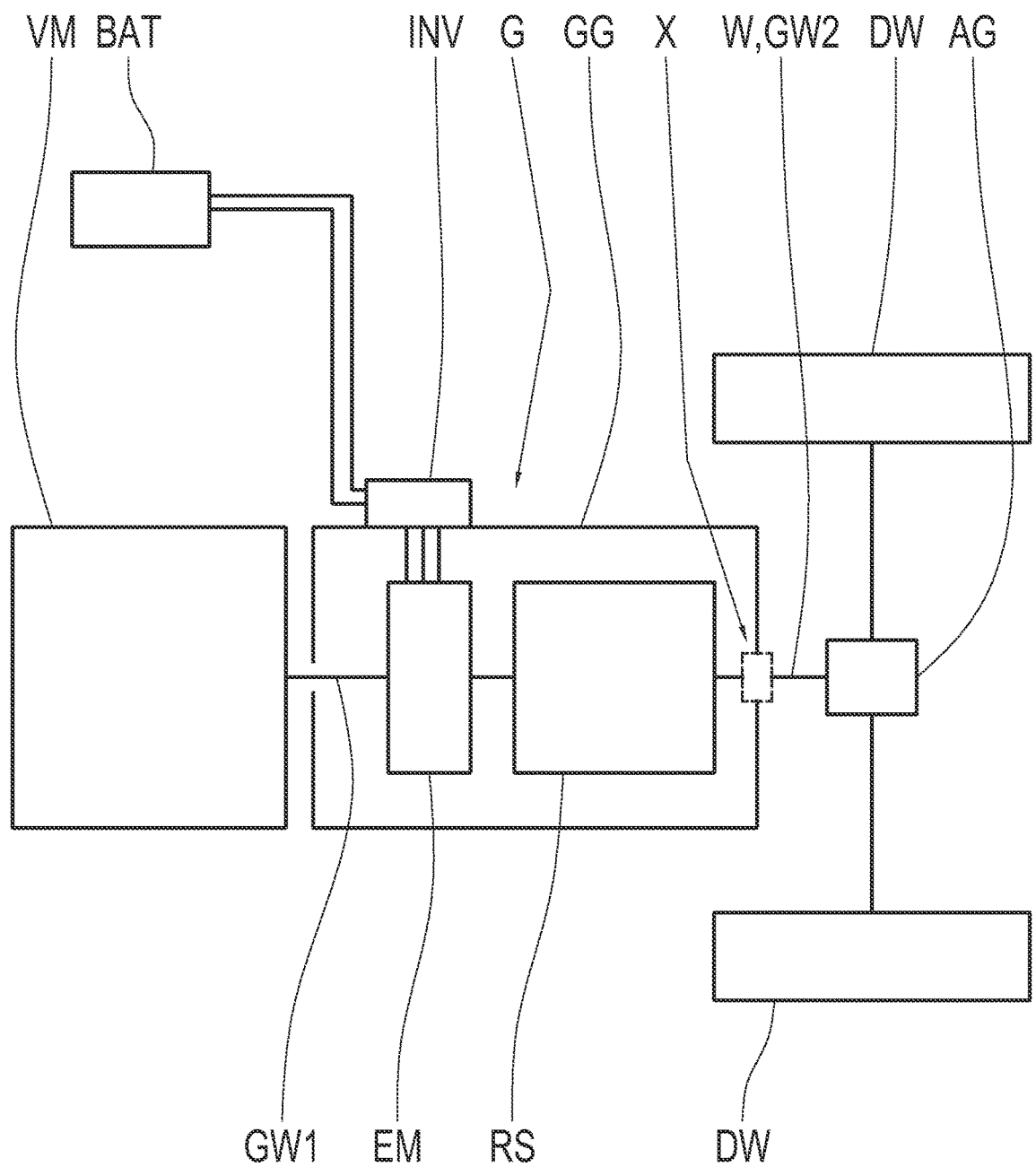

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the output of which is connected to an input shaft GW1 of a transmission G. An output shaft GW2 of the transmission G is connected to a differential gear AG. The differential gear AG is configured for distributing the power applied at the output shaft GW2 to driving wheels DW of the motor vehicle. The transmission G has a gear set RS, which, together with shift elements not represented in FIG. 1, is configured for providing different transmission ratios between the input shaft GW1 and the output shaft GW2. The gear set RS is enclosed by a housing GG, which also accommodates an electric machine EM connected to the input shaft GW1. The electric machine EM is configured for driving the input shaft GW1. A power converter INV is attached at the housing GG. The power converter INV is connected, on the one hand, to the electric machine EM and, on the other hand, to a battery BAT. The power converter INV is utilized for converting the direct current of the battery BAT into an alternating current suitable for operating the electric machine EM and, for this purpose, includes several power semiconductors. The conversion between direct current and alternating current takes place by a pulse-like operation of the power semiconductors controlled by an open-loop system.

Figure 2:
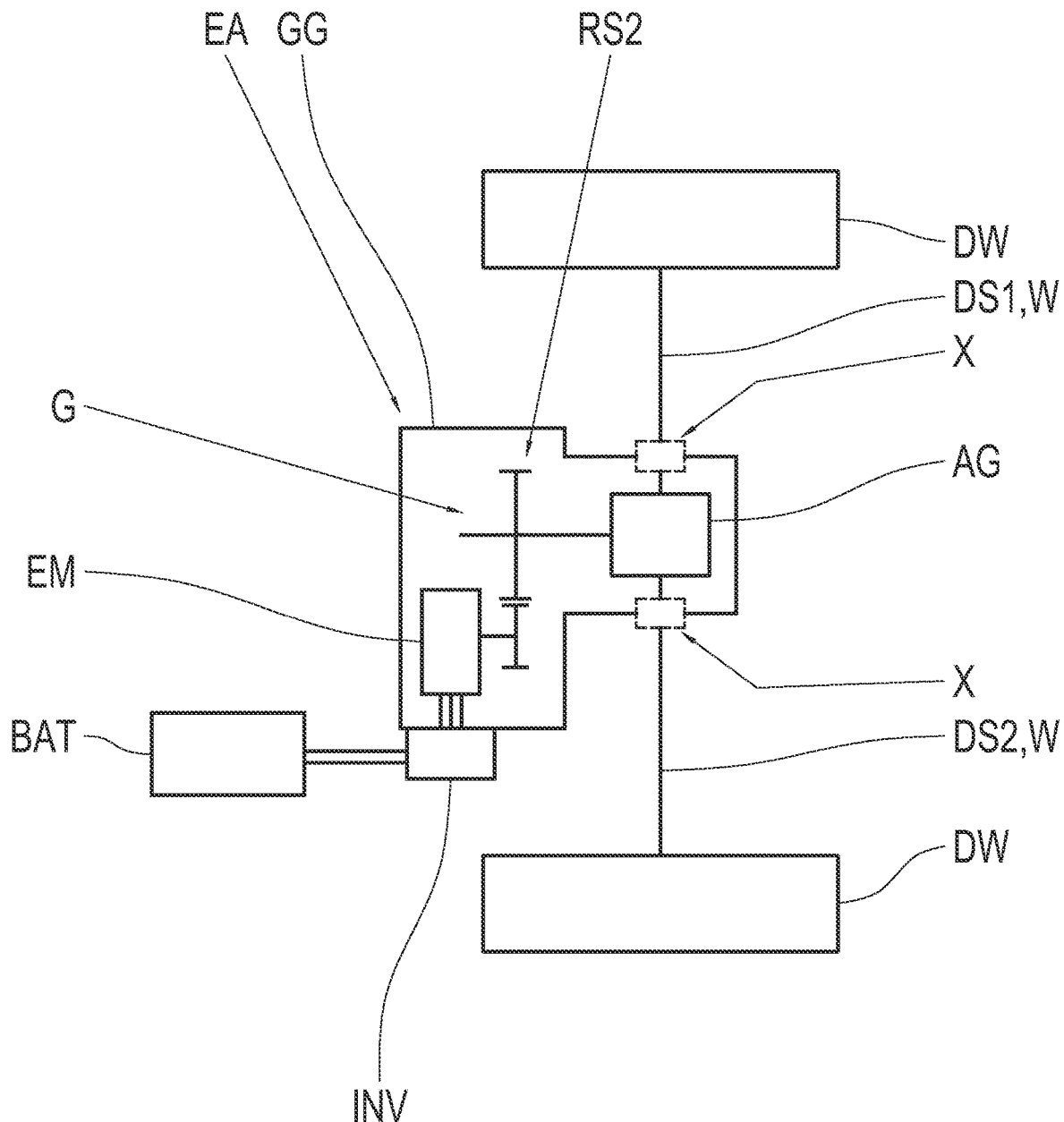

FIG. 2 diagrammatically shows a drive train for a motor vehicle, which, in contrast to the example embodiment represented in FIG. 1, is a purely electrical drive train. The drive train includes an electric axle drive EA. The electric axle drive EA includes an electric machine EM, the power of which is transmitted via a transmission G to driving wheels DW of a motor vehicle. The transmission G includes a reduction gear set RS2 and a differential gear AG. Output shafts DS1, DS2 of the differential gear AG are connected to the driving wheels DW. The transmission G of the electric axle drive EA is enclosed by a housing GG. A power converter INV is attached at the housing GG. The power converter INV is connected, on the one hand, to the electric machine EM and, on the other hand, to a battery BAT. The power converter INV is utilized for converting the direct current of the battery BAT into an alternating current suitable for operating the electric machine EM and, for this purpose, includes several power semiconductors. The conversion between direct current and alternating current takes place by a pulse-like operation of the power semiconductors controlled by an open-loop system.

The drive trains represented in FIG. 1 and FIG. 2 are to be considered merely as examples.

Due to the pulse-like operation of the power semiconductors, electromagnetic interference signals can arise, which, for example, are coupled into the output shaft GW2 in the drive train according to FIG. 1 or into the output shafts DS1, DS2 in the drive train according to FIG. 2. Due to the mounting of the output shaft GW2 and of the output shafts DS1, DS2, which is not represented in FIG. 1 and FIG. 2, respectively, the output shaft GW2 and the output shafts DS1, DS2 are electrically insulated with respect to the housing GG, however, since the lube oil in the interior of the housing GG has electrically insulating properties. Therefore, interference signals coupled into the output shaft GW2 cannot flow on a short path into the housing GG, which is connected to an electrical ground of the motor vehicle. Instead, the interference signals return to the electrical ground by electromagnetic emission, as the result of which other electronic components of the motor vehicle can be interfered with. The output shaft GW2 protruding from the housing GG and the output shafts DS1, DS2 can form an antenna, which supports the electromagnetic emission of the interference signals.

In order to improve the electromagnetic compatibility, the transmission G according to FIG. 1 has a shaft grounding arrangement X, which is configured for electrically conductively connecting the output shaft GW2 to the housing GG. The transmission G of the axle drive EA according to FIG. 2 has two shaft grounding arrangements X, which are provided for electrically conductively connecting the output shafts DS1, DS2 to the housing GG.

Figure 3:
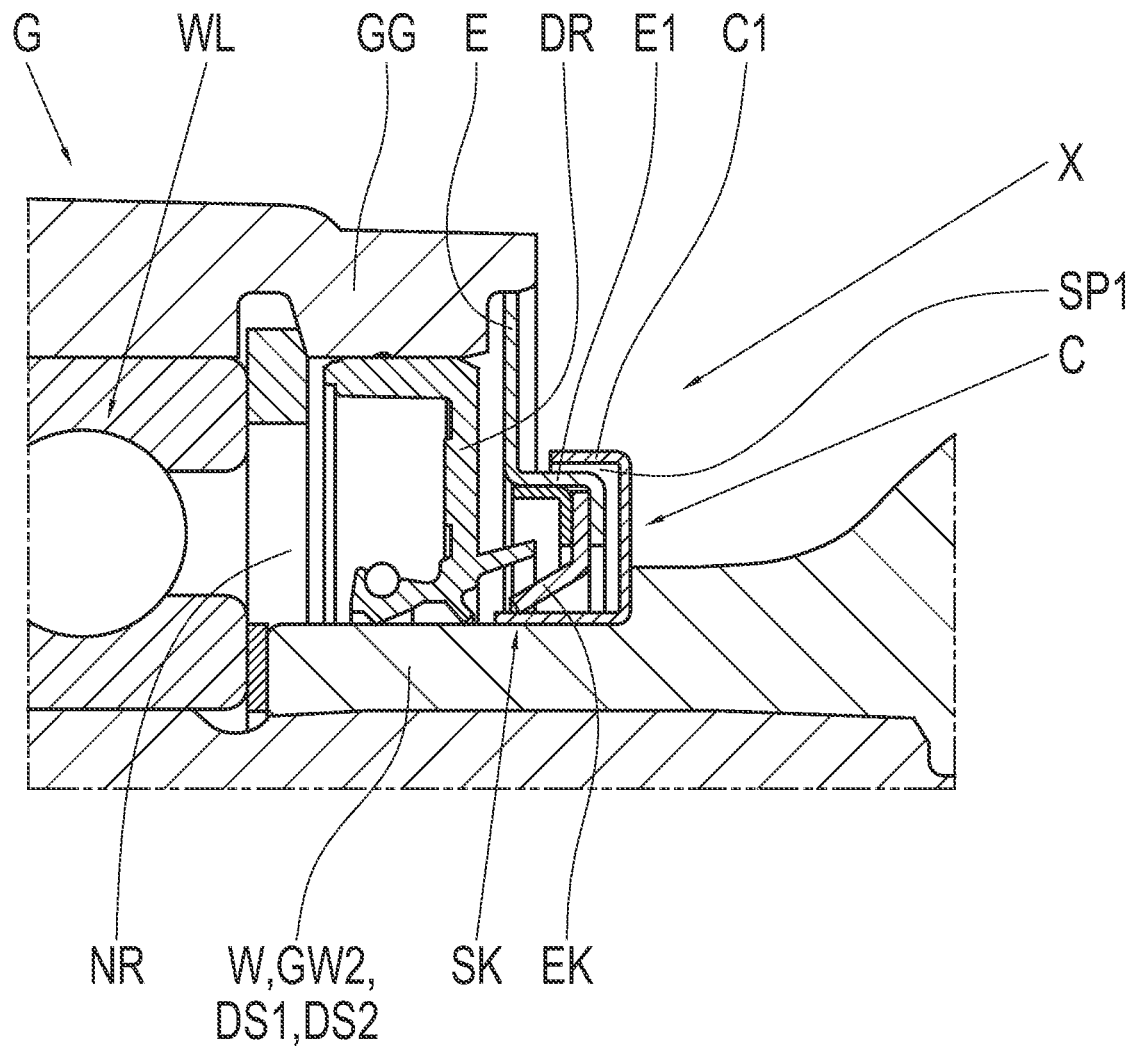
FIG. 3 shows a detailed view of a transmission having a shaft grounding arrangement.

FIG. 3 shows a detailed partial, section view of a transmission G having a shaft grounding arrangement X. In FIG. 3, the mounting and the sealing of a shaft W protruding from the housing GG are represented in detail. The shaft W represented in FIG. 3 could be, for example, the output shaft GW2 according to FIG. 1 or one of the output shafts DS1, DS2 according to FIG. 2. The shaft W is designed as multiple pieces and is supported at the housing GG by a ball bearing WL. The ball bearing WL is located in an oil space NR of the transmission G. In order to seal the oil space NR with respect to the surroundings, a radial shaft seal DR is provided with a sealing lip. A shaft grounding device E is provided at the surroundings side of the radial shaft seal DR. The shaft grounding device E is mechanically and electrically conductively connected to the housing GG. For this purpose, contact and mounting extensions (not represented in FIG. 3) are provided, by which the shaft grounding device E is mechanically and electrically connected to the housing GG. Contact elements EK of the shaft grounding device E form an electrically conductive sliding contact SK. The contact elements SK can be, for example, brushes or electrically conductive PTFE elements.

A covering element C is provided in order to protect the electrically conductive sliding contact SK against environmental influences, such as liquid or dust. The covering element C is fixedly connected to the shaft W, for example, by a press-fit connection. The covering element C and the shaft grounding device E, together, form a labyrinth sealing. The covering element C has an axially aligned section C1, which encompasses an axial projection E1 of the shaft grounding device W. A radial gap SP1 is present between the axially aligned section C1 and the axial projection E1. Due to the flow conditions in the gap SP1 between the covering element C rotating with the shaft and the non-rotating shaft grounding device E, a contactless seal is therefore formed. If water should penetrate the gap SP1 and, thereby, reach the sliding contact SK, the water can flow off at the spatial lower edge of the covering element C, and so, due to the shape of the covering element C, good protection of the sliding contact SK against dust and corrosion is formed.

The covering element C has a C-shaped cross-section and at least partially surrounds the shaft grounding device E. The radial inner leg of the C-shape forms the contact surface with the shaft W at the radial inner side and forms the running surface of the sliding contact SK at the radial outer side. The covering element C is made of stainless steel and, thereby, forms a corrosion-free running surface for the sliding contact SK. In order to improve the electrical conductivity between the covering element C and the shaft W, the shaft W is locally furnished with a coating that improves the electrical conductivity.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
EA electric axle drive
G transmission
GW1 input shaft
GW2 output shaft
RS gear set
RS2 reduction gear set
EM electric machine
INV power converter
BAT battery
AG differential gear
DS1 output shaft
DS2 output shaft
DW driving wheel
X shaft grounding arrangement
GG housing
WL ball bearing
DR radial shaft seal
NR oil space
E grounding device
EK contact elements
SK sliding contact
E1 axial projection
C covering element
C1 axially aligned section
SP1 radial gap

The invention claimed is:

1. A shaft grounding arrangement (X), comprising:
a housing (GG);
a shaft (W, GW2, DS1, DS2) supported in the housing (GG) and protruding from the housing (GG);
a shaft grounding device (E) configured for establishing an electrically conductive contact (SK) between the shaft (W, GW2, DS1, DS2) and the housing (GG); and
a cover (C) fixedly connected to the shaft (W, GW2, DS1, DS2) and configured for protecting the shaft grounding device (E) against environmental influences, the cover (C) at least partially surrounding the shaft grounding device (E),
wherein the shaft grounding device (E) is fixedly connected to the housing (GG), and the electrically conductive contact (SK) is formed by a sliding contact between contacts (EK) of the shaft grounding device (E) and a surface of the cover (C).

2. The shaft grounding arrangement (X) of claim 1, wherein the cover (C) is pressed onto a circumferential surface of the shaft (W, GW2, DS1, DS2).

3. The shaft grounding arrangement (X) of claim 2, wherein the circumferential surface of the shaft (W, GW2, DS1, DS2) is at least locally furnished with a coating in order to improve electrical conductivity between the circumferential surface and the cover (C) pressed onto the circumferential surface.

4. The shaft grounding arrangement (X) of claim 1, wherein the cover (C) is constructed of stainless steel.

5. The shaft grounding arrangement (X) of claim 1, wherein the cover (C) defines a C-shaped cross-section.

6. The shaft grounding arrangement (X) of claim 1, wherein the contacts (EK) of the shaft grounding device (E) comprise brushes or electrically conductive PTFE elements.

7. A transmission (G) for a motor vehicle, comprising the shaft grounding arrangement (X) of claim 1.

8. The transmission (G) of claim 7, wherein the shaft (W) comprises an output shaft (GW2) of the transmission (G).

9. The transmission (G) of claim 7, wherein the transmission (G) further comprises an electric machine (EM) and a power converter (INV) associated with the electric machine (EM).

10. The transmission (G) of claim 7, wherein the transmission (G) is a planetary automatic transmission, a dual-clutch transmission, an automated transmission, or a CVT transmission.

11. An electric axle drive (EA) for a motor vehicle, comprising the shaft grounding arrangement (X) of claim 1.

\* \* \* \* \*